United States Patent Office 3,238,035
Patented Mar. 1, 1966

3,238,035
HERBICIDAL USE OF N-CYCLOALKYL-N-BIS(β-CHLOROALKYL)AMINES
Adolf Fischer, Mutterstadt, Pfalz, Karl-Heinz Koenig and Horst Pommer, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Original application Apr. 18, 1961, Ser. No. 103,707. Divided and this application Feb. 12, 1964, Ser. No. 344,207
Claims priority, application Germany, Apr. 22, 1960, B 57,561
4 Claims. (Cl. 71—2.3)

This application is a division of application Serial No. 103,707, filed April 18, 1961, now abandoned.

This invention relates to new herbicides. More specifically, the invention relates to new selective weed killers whose herbicidal effect sets in very rapidly.

Many organic and inorganic compounds have been described in the priod art literature for use as weed killers. Some of these substances have a selective activity, i.e. when employed in definite concentrations they destroy weeds without affecting crop plants growing on the same area.

Aliphatic β-chloroethylamines or bis(β-chloroethyl) amines are known to have herbicidal activity. These compounds, however, have only little selectivity. Furthermore, the open-chain aliphatic bis(β-chloroethyl) amines cause blistering when they come into contact with the human skin, a phenomenon which has long been known to be caused also by tris(β-chloroethyl)amine.

It is an object of the present invention to provide herbicides which do not exhibit the disadvantages of prior art herbicides.

Another object is to provide herbicides which have good selectivity.

Still another object is to provide herbicides which do not produce long-lasting after-effects with respect to cultivated plants.

We have found that cycloaliphatic bis(β-haloethyl) amines of the formula:

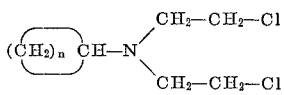

and their hydrochlorides are excellent agents for controlling undesirable plant growth. In the said formula, $n$ denotes one of the numbers 5, 6 and 7.

Unlike tris(β-chloroethyl)amine, the herbicides according to the present invention are non-toxic and do not cause blistering of the human skin. The compounds are distinguished by good selectivity. They rapidly destroy dicotyledonous plants, but leave monocotyledonous plants, for example cereal crops, undamaged. They are also suitable for use as defoliating agents, for example for potatoes.

The compounds of the present invention may be obtained by the following reaction:

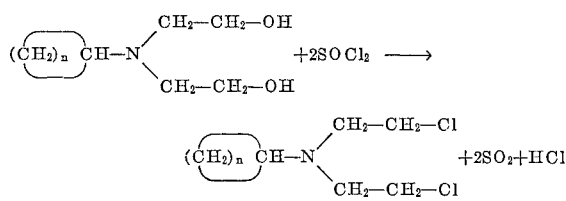

In the foregoing formulae, $n$ has the meaning given above.

The cycloaliphatic bis(β-hydroxyethyl)amines which are used as starting materials are readily accessible technically by hydroxyalkylation of the appropriate amines. Conversion of the amino alkanols or their salts into the corresponding haloalkyl compounds may be carried out with, for example, phosphorus halides, phosphorus oxyhalides, thionyl halides or halogen hydracids, if necessary under pressure. As reaction media, inert substances such as halogenated, alkylated or unsubstituted hydrocarbons, preferably benzene, toluene or chloroform, are especially suitable. The reaction temperature should be in the range of between 30° and 90° C. The well crystallized end products are stable and have good storage properties.

Preparation of the compounds may, for example, be as follows (parts being by weight):

108 parts of N-cyclooctyl-N-di(β-hydroxyethyl)amine of the boiling point 180° C./3 mm. Hg is dissolved in 200 parts of benzene, and 132 parts of thionyl chloride is added at 30° to 45° C. The reaction is allowed to continue for 2 hours at 60° to 80° C. while stirring. The crystalline mass which is deposited on cooling is filtered off by suction. The product obtained after recrystallization from a mixture of acetone and alcohol (2:1) melts at 170° to 171° C. The yield is 92% of the theory.

All of the compounds according to the present invention may be prepared in basically the same manner. The following substances are mentioned by way of example: N-cycloheptyl-N-bis(β-chloroethyl)amine hydrochloride (melting point 172° to 173° C.); N-cyclohexyl-N-bis(β-chloroethyl)amine hydrochloride (melting point 174° to 175° C.); and N-cyclooctyl-N-bis(β-chloroethyl)amine hydrochloride (melting point 170° to 171° C.).

The new compounds can be applied in conventional manner for the purpose of killing weeds or inhibiting the growth of weeds. It is advantageous to use the compounds in the form of their salts, preferably as hydrochlorides. They can be applied in liquid or dry form, for example dissolved in water or as aqueous dispersions or can be mixed with any dry inert carrier, with fertilizers or with other herbicides. If they are used as aqueous solutions or dispersions, the solutions or dispersions should contain the new herbicides in amounts of, preferably, 0.1 to 5% by weight with reference to the amount of water.

The herbicides are applied in phytotoxic quantities, i.e. in amounts which are sufficient to cause inhibition of the growth of undesirable plants or their complete destruction. In general, about 1 to 30 kilograms/hectare of active substance, for example in the form of about 100 to 1000 liters/hectare of a 1 to 3% aqueous dispersion or solution, is applied.

Their good selectivity, their non-taxicity and the fact that they do not cause blistering of the human skin makes the new herbicides superior to the prior art compounds. Furthermore, the after-effect periods of the new compounds are very short. The substances are, therefore, especially valuable for use on areas which are to be recultivated without delay.

The use of the compounds according to this invention will be further illustrated by the following examples.

*Example 1*

In a greenhouse, N-cyclooctyl-N-bis-(β-chloroethyl)-amine hydrochloride was sprayed in amounts of, respectively, 2, 3 and 4 kilograms/hectare dissolved in 1000 liters of water, on the following plants: *Sinapis alba* (white mustard), *Galium aparine* (cleavers), *Polygonum persicaria* (spotted knotgrass), *Veronica agrestis* (field speedwell) and *Secale cereale* (rye). The damage to the various plants may be seen from the following table (0=no damage; 5=total damage):

| Amount used, kg./hectare | Sinapis alba | Galium aparine | Polygonum persicaria | Veronica agrestis | Secale cereale |
|---|---|---|---|---|---|
| 2 | 4 to 5 | 4 to 5 | 3 to 4 | 4 | 0 to 1. |
| 3 | 4 to 5 | 5 | 4 to 5 | 4 to 5 | 0 to 1. |
| 4 | 5 | 5 | 5 | 5 | 1. |

As can be seen from the table, the dicotyledonous plants were very severely damaged, whereas rye treated with the same amounts of the said herbicide remained practically unaffected.

Almost equal results were obtained by using the hydrochlorides of N-cyclooctyl-N-bis($\beta$-chloropropyl)amine and of N-cyclooctyl-N-bis($\beta$-chlorobutyl)amine instead of N-cyclooctyl-N-bis($\beta$-chloroethyl)amine hydrochloride.

*Example 2*

Two agricultural areas severely infested with wild radish, wild mustard, knotgrass, dead nettle, speedwell, fumitory, chickweed and orach were sprayed with solutions of 15 kilograms/hectare of N-cyclooctyl-N-bis($\beta$-chloroethyl)amine hydrochloride and N-cyclohexyl-N-bis($\beta$-chloroethyl)amine hydrochloride, respectively, in 1000 liters of water. After about a fortnight, most of the weed plants had withered. The said areas could then immediately be cultivated with crop plants to which no damage was done by the herbicide.

*Example 3*

Shortly before harvesting, the stalks of a standing potato crop were rolled and sprayed with a solution of 30 kilograms/hectare of N-cyclooctyl-N-bis($\beta$-chloroethyl)amine hydrochloride in 1000 liters of water. After only 2 to 3 days, the leaves of the potato plants began to wither, whereas the stalks did not die until after about a fortnight.

The hydrochloride of N-cycloheptyl-N-bis($\beta$-chloroethyl)amine produces the same effect.

What we claim is:

1. A method of combating undesirable vegetation which comprises applying to said vegetation and to the soil surrounding said vegetation a phytotoxic quantity of a member selected from the group consisting of N-cycloalkyl-N-bis($\beta$-chloroalkyl)amines having the general formula:

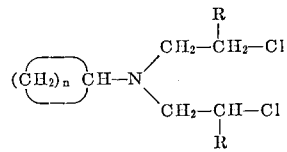

wherein $n$ is one of the integers 5, 6 and 7 and R is a member selected from the group consisting of hydrogen, methyl and ethyl, and the hydrochlorides thereof.

2. A method of combating undesirable vegetation as claimed in claim 1 which comprises applying to said vegetation and to the soil surrounding said vegetation a phytotoxic quantity of N-cyclooctyl-N-bis($\beta$-chloroethyl)amine hydrochloride.

3. A method of combating undesirable vegetation as claimed in claim 1 which comprises applying to said vegetation and to the soil surrounding said vegetation a phytotoxic quantity of N-cyclohexyl-N-bis($\beta$-chloroethyl)amine hydrochloride.

4. A method of combating undesirable vegetation as claimed in claim 1 which comprises applying to said vegetation and to the soil surrounding said vegetation a phytotoxic quantity of N-cycloheptyl-N-bis($\beta$-chloroethyl)amine hydrochloride.

No references cited.

LEWIS GOTTS, *Primary Examiner.*